(12) United States Patent
Abel et al.

(10) Patent No.: US 8,661,949 B2
(45) Date of Patent: Mar. 4, 2014

(54) POWER LINE SPREADING DEVICE

(75) Inventors: James Abel, Dodge City, KS (US); S. Troy Snook, Ford, KS (US)

(73) Assignee: Enough Said, LLC, Dodge City, KS (US)

( * ) Notice: Subject to any disclaimer, the term of this patent is extended or adjusted under 35 U.S.C. 154(b) by 284 days.

(21) Appl. No.: 13/013,134

(22) Filed: Jan. 25, 2011

(65) Prior Publication Data

US 2012/0186406 A1    Jul. 26, 2012

(51) Int. Cl.
*B25B 11/00*    (2006.01)

(52) U.S. Cl.
USPC .............. 81/485; 403/292; 403/296; 403/345

(58) Field of Classification Search
USPC ............ 81/485; 403/292, 296, 345; 294/19.1, 294/19 R
See application file for complete search history.

(56) References Cited

U.S. PATENT DOCUMENTS

| | | | | |
|---|---|---|---|---|
| 2,594,429 | A | * | 4/1952 | Handley .......................... 294/96 |
| 3,734,462 | A | * | 5/1973 | Slade .............................. 254/1 |
| 3,866,965 | A | * | 2/1975 | Homeier ....................... 294/174 |
| 5,915,770 | A | * | 6/1999 | Bergstrom .................... 294/174 |
| 5,915,893 | A | * | 6/1999 | Miyanaga ..................... 408/202 |
| 2008/0166195 | A1 | * | 7/2008 | Gentry et al. ................. 408/224 |

OTHER PUBLICATIONS

Hastings Fiber Glass Products, Inc., Telescopic Hot Sticks, Catalog, Section A-1, Feb. 2001, United States.
Hastings Fiber Glass Products, Inc., Accessories, Catalog, Section F-2, Jun. 2000, United States.
Hastings Fiber Glass Products, Inc., Bolt & Cable Cutters, Catalog, Section E-7-2, Jun. 2003, United States.
Hastings Fiber Glass Products, Inc., Insulated Ratchet Cutters, Catalog, Section E-7-1, 1998, United States.
Hastings Fiber Glass Products, Inc., Shotgun Sticks, Catalog, Section D, 1996, United States.
Photograph of product; photograph was provided to Jim Abel by Alliant Energy on Jan. 4, 2012; no other information known.

* cited by examiner

*Primary Examiner* — Lee D Wilson
*Assistant Examiner* — Shantese McDonald
(74) *Attorney, Agent, or Firm* — Husch Blackwell LLP

(57) ABSTRACT

A power line spreading device used to separate the two conductor lines of a twisted pair conductor. The spreading device includes a substantially conical body and a handle. The body further includes a groove in an outer surface orientated in a conic spiral along a length of the body wherein the diameter of the conical body gradually increases from a first end to a second end. The spreading device is engaged with the two conductor lines proximate the first end, rotated about an axis of rotation whereby the groove acts to draw the two conductor lines from a first end toward a second end of the body. The gradual increase in diameter of the spreading device causes and maintains a desired spread distance between the two conductor lines of a twisted pair connector.

1 Claim, 4 Drawing Sheets

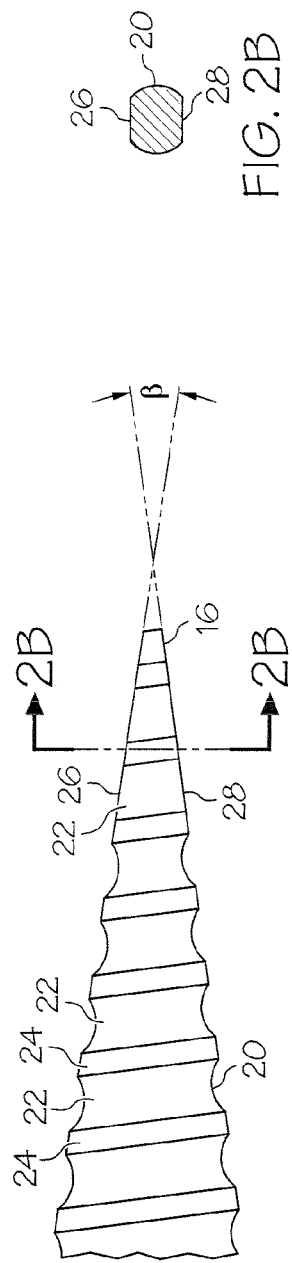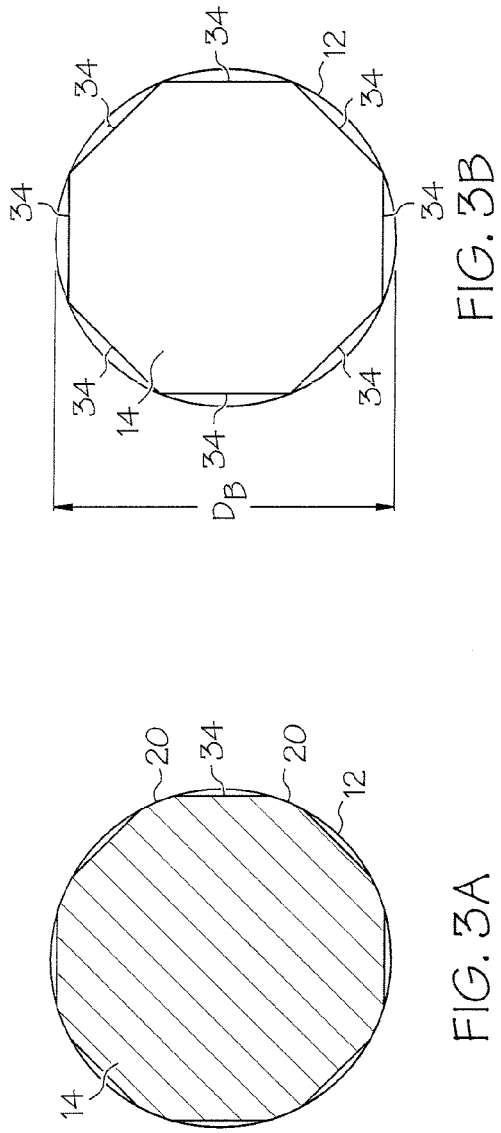

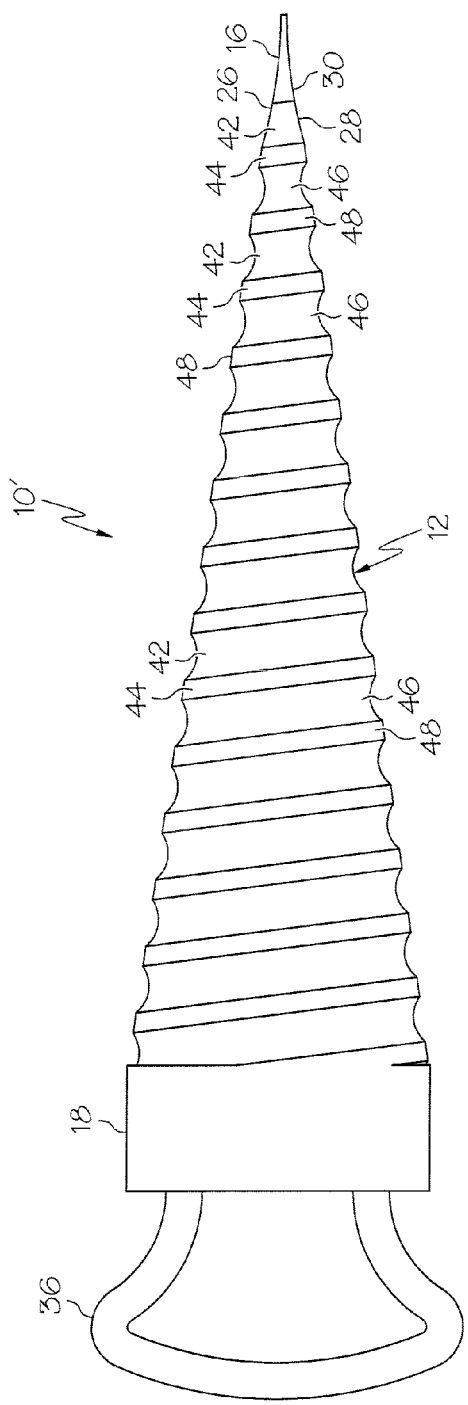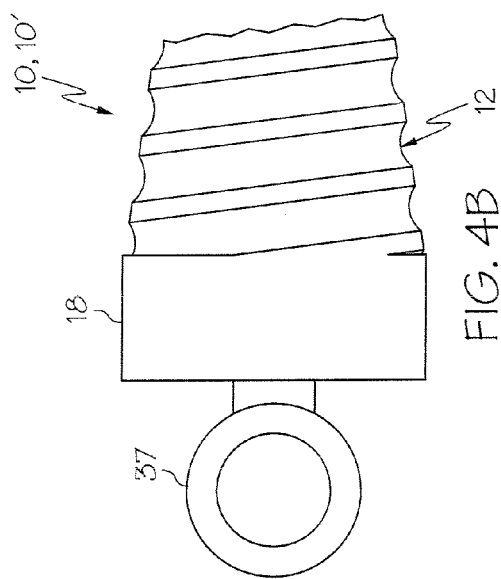

POWER LINE SPREADING DEVICE

CROSS-REFERENCE TO RELATED APPLICATIONS

None.

BACKGROUND OF THE INVENTION

To more efficiently transmit electricity, a twisted pair conductor has been utilized by many utility companies. A twisted pair conductor generally comprises two standard, round conductor lines twisted around each other at approximately nine foot intervals. A twisted pair conductor is beneficial because it has lower maintenance, operating and inspection costs, a lower operating temperature, and reduces galloping. Further, a twisted pair conductor effectively resists wind induced motion in two ways. First, the constantly varying diameter due to the twisting drastically inhibits resonant vibration. Second, the low torsion stiffness of this configuration absorbs and dissipates motion causing wind forces. Common brands of a twisted pair conductor commercially available are T-2® and VR2®.

The use of the twisted pair conductor has consistently increased since its introduction. One problem inherent in the use of the twisted pair conductor is that in order to install a connector or other device directly to one of the individual conductor lines, the two twisted conductor lines must be separated by a given amount to facilitate the installation. When installed and in use, a twisted pair conductor has an inherent tension force due to the weight of the conductor lines causing sag between electric poles or supports, thereby resulting in a tension stress in each of the two conductor lines. In addition, a twisted pair conductor may be pre-tensioned to reduce its sag between supports. The tension stress in the conductor lines generally resists the separation and spreading of the two conductor lines. Further, because two conductor lines are twisted together to form the twisted pair conductor, the two conductor lines inherently resist separation. The inherent stiffness of each individual conductor line combined with the tension force makes it virtually impossible to separate the wires sufficiently by hand.

In use, the combination of the tension and twisting of the two conductor lines of a twisted pair conductor is such that an electric line installation or maintenance person will only be able to manually separate the two conductor lines a small distance, often only around one-quarter inch (¼"), using their hands. Any manual spreading, however, is of little or no use because the spread distance required to install connectors and other devices is greater than the distance a person can separate the wires using their hands. Further, because both of the user's hands are required to separate the lines, a two-person crew is necessary to perform any connection or other device installation manually. Thus, some mechanical means is necessary to allow a line installation or maintenance person to individually separate the two connector lines of a twisted pair conductor and install a connector or other known device.

Currently, line installation or maintenance personnel use a wooden stake, a screwdriver, or a hammer handle to separate or pry the two twisted conductor lines apart. All of these make-shift separators have negative aspects. All three require the user to push the stake, screwdriver, or handle between the two conductor lines with a substantial force to effectively wedge the tensioned lines apart. In addition, in order to remove these tools, the user must pull with a substantial force to retrieve the tool from between the two tensioned conductor lines. Not only is this method physically demanding, but this method of brute force operation poses dangers to users in the field, particular if they are suspended in a basket or by a harness above the ground. The force required may put the user at risk of losing their balance as the tool may slip or undergo other drastic resistance changes during the linear pushing or pulling. When a user loses their balance, they are not only in danger of falling, but also at risk of directly touching a live high-voltage electric wire and/or grounding themselves when trying to catch their balance. These conditions put the life of the line installation or maintenance person at risk.

Further, all of these adapted tools—the stake, screwdriver, and hammer handle—generally result in nick marks, scarring, dents, or other damage to the surface of the conductor lines. The scarring and nick marks result in increasing the resistance in the conductor lines and, in aggregate, can result in substantial energy loss throughout the transmission system. Further, a nick or dent in the outer surface of a wire creates a position of stress concentration which may result in a weak spot on the line that is more vulnerable to failure during an extreme weather event.

Therefore, a need exists for a conductor line spreading device that allows an operator to easily spread the two twisted conductor lines of a twisted pair conductor without exerting a substantial amount of effort and in a safe, effective, and efficient manner. Accordingly, an additional need exists for a conductor line spreading device that allows a single person to accomplish the task and that eliminates any scarring and nicking of the conductor lines to help maintain the efficiency and reliability of the electricity distribution network.

SUMMARY OF THE INVENTION

The present invention is generally directed to a spreading device used to separate the two conductor lines of a twisted pair conductor. A twisted pair conductor generally comprises two standard, round conductor lines twisted around each other at approximately nine foot intervals and is generically referred to as power line. Spreading the two conductor lines apart is required to perform maintenance and repairs of existing twisted pair conductors, or to tie a new line into an existing conductor line. The present power line spreading device includes a substantially conical body and may include a handle. The body includes a first end and a second end wherein the diameter of the conical body increases from the first end to the second end. The body further includes a groove on an outer surface orientated in a conic spiral along a length of the body. The body is generally made of a non-conductive material, but, one embodiment includes a body being made from a conductive material when used with non-live wires.

When using the present conductor line spreading device, the first end or terminal end of the body is positioned between the two conductor lines such that the two conductor lines engage and contact the groove. The body of the spreading device is then rotated about its longitudinal axis using the handle. The orientation of the groove allows the groove to engage the two conductor lines and gradually change the relative position of the lines with respect to the spreading device from the first end toward the second end. The change in relative position in a direction toward the second end of the spreading device causes an increase in the distance between the two conductor lines corresponding to the increase in the diameter of the body of the present spreading device from the first end to the second end.

The handle can be integral with the body or may be a distinct element coupled to the body. Generally, a person manually rotates the body via applying torsional force to the handle by hand. The handle may include an abrasive or roughened portion to improve gripping by a user. However, the device may also be configured to engage a ratchet, wrench, fiberglass rod, "hot-stick" or a pneumatic, electric, or cordless drill or driver. In such an embodiment, the ratchet, wrench, fiberglass rod, "hot-stick" or the pneumatic, electric, or cordless drill or driver applies a torsional force to the device to cause rotation of the body about its longitudinal axis.

The body of the present spreading device can be made to achieve different second end portion diameters so as to achieve different spreading distances depending upon the particular application.

Other aspects and advantages of the present invention will be apparent from the following detailed description of the preferred embodiments and the accompanying drawing figures.

BRIEF DESCRIPTION OF THE DRAWING

The accompanying drawings form a part of the specification and are to be read in conjunction therewith, in which like reference numerals are employed to indicate like or similar parts in the various views, and wherein:

FIG. 2A is a side view of the first end of the power line spreading device of FIG. 1 to show the power line spreading device's wedged end;

FIG. 2B is a cross-sectional view of the first end of the power line spreading device of FIG. 1 cut along line 2B-2B of FIG. 2A to illustrate the power line spreading device's wedged end;

FIG. 3A is a cross-section view of one embodiment of a handle cut along the line 3A-3A of FIG. 1 constructed in accordance with the teachings of the present invention;

FIG. 3B is a cross-section view of another embodiment of a handle for use with the present power line spreading device constructed in accordance with the teachings of the present invention;

FIG. 4A is a side view of another embodiment of the present power line spreading device constructed in accordance with the teachings of the present invention;

FIG. 4B is a side view of another embodiment of the present power line spreading device constructed in accordance with the teachings of the present invention.

DETAILED DESCRIPTION OF THE INVENTION

The following detailed description of the present invention references the accompanying drawing figures that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Figure 1:
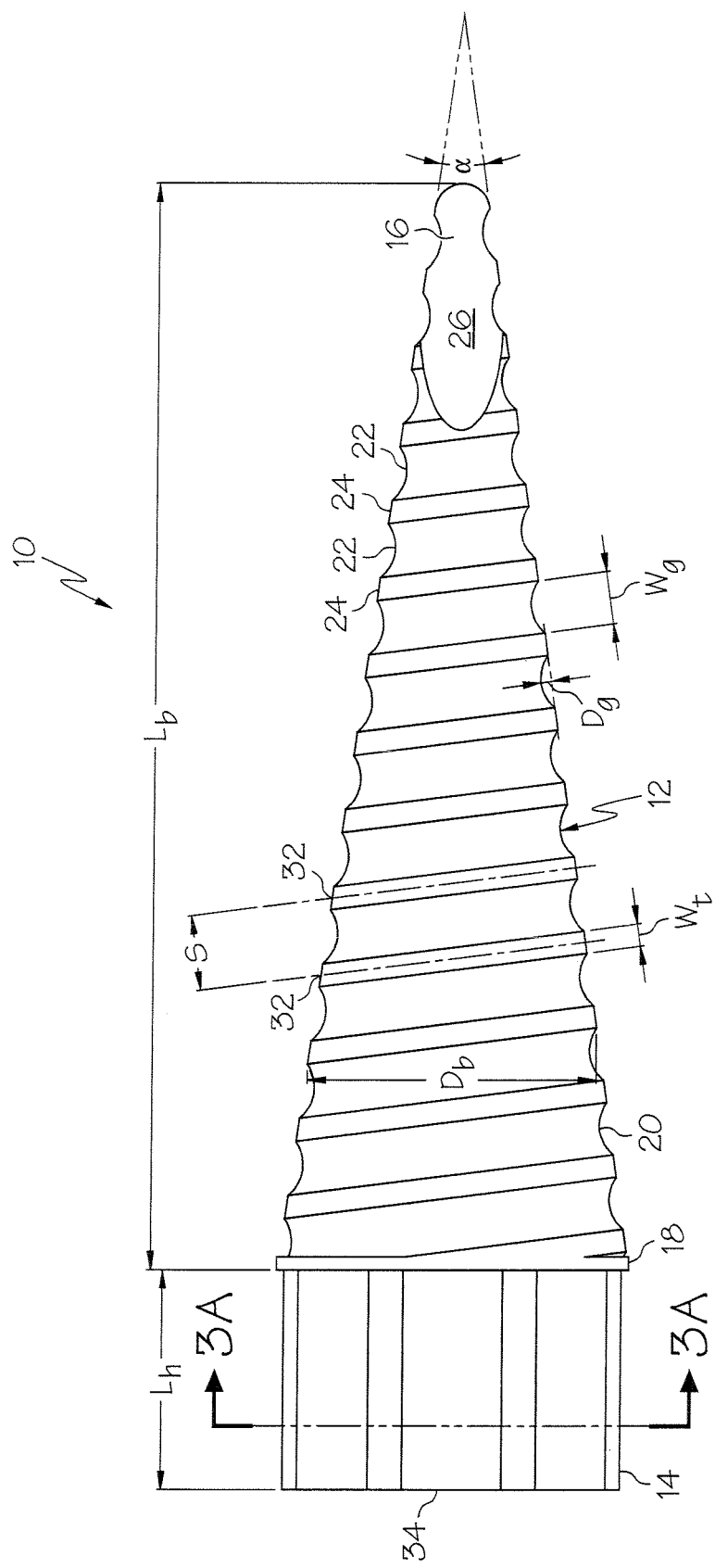
FIG. 1 is a top view of a power line spreading device constructed in accordance with the teachings of one embodiment of the present invention.

Turning to FIG. 1, an embodiment of the present power line spreading device 10 is illustrated. Power line spreading device 10 generally comprises a substantially conical body 12 and a handle 14. Body 12 includes a first end 16, a second end 18, an outer face 20, a length $L_b$, and a diameter $D_b$. Body 12 also includes at least one spiral groove 22 in outer face 20, and at least one corresponding thread 24 wherein both groove 22 and thread 24 are substantially continuous along the body's length $L_b$.

Length $L_b$ of body 12 may range from three inches (3") or less to twenty inches (20") or more, although any length outside of this range is likewise anticipated depending upon the particular application. One embodiment includes a length $L_b$ ranging from about eight inches (8") to about sixteen inches (16"). Another embodiment includes a length $L_b$ of about twelve inches (12"). The principle of the invention, however, is not dependent upon the length $L_b$ of body 12 and, as such, a person of skill in the art will appreciate that length $L_b$ of body 12 shall not be limiting.

First end or terminal end 16 is generally narrower than second end 18. Diameter $D_b$ varies along the length $L_b$ of body 12 wherein diameter $D_b$ at first end 16 is less than diameter $D_b$ at second end 18. The diameter $D_b$ at first end 16 may range from about one-quarter inch (¼") to about two inches (2"), while the diameter $D_b$ at second end 18 may range from about one inch (1") to about six inches (6") or more. The diameter $D_b$ at second end 18 may correspond to the diameter of pre-manufactured round stock material used in the manufacture of body 12. Alternatively, diameter $D_b$ at second end 18 may correspond to a spread distance desired by a particular user. Again, diameter $D_b$ from the first end 16 to the second end 18 can vary depending upon the desired spread distance and/or the particular application.

Generally, diameter $D_b$ uniformly increases from first end 16 to second end 18 along length $L_b$ such that the shape defined by outer surface 20 substantially corresponds to a cone having a vertex angle α ranging from three degrees (3°) to forty-five degrees (45°), although other ranges are also anticipated depending upon the particular application. In one embodiment, the shape defined by outer surface 20 of body 12 corresponds to a cone having vertex angle α ranging from five degrees (5°) to fifteen degrees (15°). Preferably, the shape defined by outer surface 20 of body 12 corresponds to a cone having vertex angle α of around ten degrees (10°). A person of skill in the art will appreciate that as the vertex angle increases, the number of rotations required to obtain the desired spread distance $D_s$ (FIG. 5) decreases, however, the torsional force required to create the desired spread distance $D_s$ increases.

In addition, one embodiment of first end 16 includes a tip portion having a smooth conical shape which does not include a groove. An alternative embodiment includes groove 22 extending fully to the tip of the cone at first end 16. Another embodiment of first end 16 of power line spreading device 10 includes at least a first wedge face 26, and may include a second wedge face 28 opposite the first wedge face 26 as illustrated in FIG. 2A, to form a wedge at first end 16 to facilitate inserting spreading device 10 between two power lines. In this embodiment, the remaining portion of outside surface 20 retains an arcuate, substantially conical shape as shown in FIG. 2B. In another similar embodiment, the remaining portions adjacent to first and second wedge faces 26 and 28 of first end 16 are also planar resulting in a substantially rectangular cross-section (not shown).

As further shown in FIG. 2A, the first wedge face 26 and second wedge face 28 are planar and intersect each other at an angle β. Intersection angle β may correspond to vertex angle α, and as such, intersection angle may range from about three degrees (3°) to about forty-five degrees (45°). Embodiments of spreading device 10 may include intersection angle β being identical to, greater than, or less than vertex angle α. However, intersection angle β preferably does not vary more than 5 degrees (5°) from vertex angle α. A further alternative embodiment includes first wedge face 26 and second wedge face 28 being arcuate or curved as shown in FIG. 4A to define a "spooned" or concaved end portion 30 of first end 16. This embodiment will generally have a similar cross-section to the embodiment shown in FIG. 2B.

Groove 22 is generally defined by the thread 24 located on either side of groove 22 as shown in FIG. 1. Groove 22 and thread 24 generally follow a continuous conic spiral path along the length $L_b$ of body 12 wherein the centers 32 of threads 24 may be spaced apart at a spacing S. Groove 22 may have an arched profile defined by a width $W_g$ and a depth $D_g$. Width $W_g$ of groove 22 may generally range from about one-quarter inch (¼") to about two inches (2") and one embodiment includes a width $W_g$ of about one-half inch (½"). Groove depth $D_g$ may generally range from about one-sixteenth inch (1/16") to about one inch (1"). Groove depth $D_g$ may also vary along the length of groove 22 such that the groove depth $D_g$ gradually increases from a smaller depth $D_g$ at the first end 16 to a larger depth proximate said second end 18. An embodiment of spreading device 10 may also include groove 22 having a "V" shape or square shape with similar ranges of width $W_g$ and depths $D_g$. Groove width $W_g$ and depth $D_g$ may correspond to or be configured to receive a certain diameter of power line or other tensioned wire being separated by spreading device 10 and such width $W_g$ and depth $D_g$ may vary accordingly depending upon the particular application.

FIG. 4A illustrates one embodiment of spreading device 10' similar to the embodiment shown in FIGS. 1-3B but having two grooves in a double conical spiral configuration. Such an embodiment includes a first groove 42 and a first thread 44 being started proximate first wedge face 26 and a second groove 46 and a second thread 48 starting proximate second wedge face 28. First groove 42 and adjacent second groove 46 are configured in a double conic spiral along the length $L_b$ of body 12. First groove 42 and second groove 46 are generally delineated by first thread 44 on one side and second thread 48 on the other side as shown in FIG. 4A.

Spacing S may also be referred to as "thread spacing" being defined in threads-per-inch. Spacing S of thread 24 of the present invention may range from about one-half (½) threads-per-inch to about three (3) threads-per-inch. One embodiment may include groove 22 at a spacing S of about one (1) thread-per-inch to about one-and-one-half (1½) threads-per-inch. Still another embodiment includes groove 22 configured to a spacing S of about one and one-quarter (1¼) threads-per-inch. Groove 22 may be configured to spread conductor lines when torsion force is applied in either a clockwise or counter clockwise direction. However, it is preferable that the configuration of groove 22 matches known rotation directions for other threaded members. Accordingly, groove 22 of spreading device 10 is preferably configured to require a clockwise rotation to be applied to advance spreading device 10 to create a spread distance $D_s$ (FIG. 5) between two conductor lines and, as such, an opposite counter-clockwise rotation to be applied to reduce spread distance $D_s$ and remove spreading device 10 from engagement with the conductor lines.

As further shown in FIG. 1, thread 24 is a conic spiral substantially along the length $L_b$ of body 12. Thread 24 has a width $W_t$ that ranges from about one-sixteenth inch (1/16") to about two inches (2"). In one embodiment, width $W_t$ of thread 24 ranges from about one-eighth inch (⅛") to about one-half inch (½"). Generally, width $W_t$ of thread 24 plus the groove width $W_g$ equal spacing S.

Body 12 of the spreading device of the present invention may be of any material known in the art. One embodiment of spreading device 10 may be used with live conductor lines while other embodiments may be used with non-live wires. When used with live wires, body 12 is preferably a material that is electrically non-conductive or an insulator including, but not limited to, ultra-high-molecular-weight ("UHMW") polyethylene, low-density polyethylene, high-density polyethylene, wood, glass, porcelain, and composite polymer materials or any other suitable material now known or hereafter discovered. The present spreading device may also be used with non-live conductor lines such as during the installation of new power lines or power grid or repairs in off network lines. In this case and in addition to the non-conductive materials above, body 12 may be constructed from a metallic material including, but not limited to, aluminum, steel, brass, copper or any other known metal. A preferred embodiment includes body 12 being UHMW polyethylene. UHMW polyethylene is a material very well suited for body 12 of spreading device 10 as it is non-conductive, lightweight, non-brittle, able to be machined, able to hold a smooth finish to provide a low friction surface, durable enough to not deform under the compressive force of the separated tensioned wires, and soft enough not to nick or damage conductor lines or other tensioned wire during use. Body 12 can, however, be made from any material that provides one or more of the above-identified properties and still be within the scope of the present invention.

Body 12 may be machined from stock materials, or it can be cast, forged, molded, extruded, or blown. One embodiment includes machining the conical shape from a piece of round stock on a lathe. The machining may be done manually, or may be performed by any automatic machining system known in the art. Automatic manufacturing may be performed in a CAD/CAM system. An alternative method of manufacture includes injection molding, compression molding, resin transfer molding, transfer molding of composite materials or metals, and any other molding method know in the art. In addition to the methods identified above, body 12 may be manufactured using any manufacturing method known in the art capable of forming body 12 as described herein.

Handle 14 may be integral with body 12 as shown in FIG. 1. An embodiment of spreading device 10 includes handle 14 having a length $L_h$ ranging from about one-quarter inch (¼") to about ten inches (10"), although other lengths may likewise be utilized. Embodiments including handle 14 being unitary with body 12 wherein spreading device 10 is manufactured through machining a single piece of stock, or molding the entire spreading device 10 in a single mold. In another embodiment, handle 14 may be a distinct piece that is coupled to or integral with body 12 as shown in FIG. 4A. Still another embodiment includes a handle that is removably engaged or coupled with body 12 wherein second end 18 includes a housing configured to receive a portion of the handle and the handle can be removed for storage or transport. The handle length $L_h$ in embodiments wherein the handle is integral to body 12 may preferably range from about three inches (3") to about six inches (6"), though any length $L_h$ may be provided and is within the scope of the present invention.

FIGS. 3A and 3B illustrate embodiments of handle 14 wherein handle 14 is integral with body 12. FIG. 3A illustrates an embodiment of spreading device 10 wherein handle 14 includes a plurality of planar faces 34 and wherein a portion of the rounded outer face 20 of a piece of rounded stock material is mechanically removed or left off to form a planar face 34. Therefore, outer face 20 includes alternating planar 34 and curved 20 surfaces. FIG. 3A illustrates an embodiment wherein eight planar faces 34 are included and alternate with a portion of curved outer face 20. However, any number of planar faces 34 may be utilized and are within the scope of the present invention. FIG. 3B illustrates another embodiment of spreading device 10 wherein handle 14 includes a plurality of planar faces 34 and wherein the planar faces 34 form a polygon. FIG. 3B illustrates an embodiment wherein eight planar faces 34 form an octagon. However, any number of faces may be utilized and are within the scope of the present invention. In another embodiment, planar faces 34 may be positioned and located to engage a pair of pliers, wrench, ratchet, socket, or a motorized driver such as an electric, pneumatic, or cordless power tool.

An embodiment of the spreading device of the present invention includes body 12 being molded around the handle. FIG. 4A illustrates an embodiment of spreading device 10' including an arched handle 36 being coupled to, or molded with, body 12 using any method known in the art. A person of skill in the art will appreciate that handle 14 or 36 may be one of any suitable handle shape, and all such handle shapes known or further developed are within the scope of the present invention. A further embodiment of handle 14 or 36, not shown, includes a hex-head, square, bolt or other projection coupled to or projecting from the second end 18 of body 12 to allow body 12 to be twisted using a pair of pliers, ratchet, socket, wrench, pair of vise-grips, or motorized driver such as an electric, pneumatic, or cordless power tool. Yet another embodiment of handle 14, not shown, includes handle 14 being a metal rod of round or polygonal cross-section coupled to, or molded with, body 12 such that the metal rod may be received into a drill or driver chuck and said body 12 may be turned using an electric, pneumatic, or cordless drill, driver or other power tool.

A further embodiment of the handle includes an eye 37 integral with or coupled to second end 18 of body 12 as shown in FIG. 4B. Eye 37 is generally configured to engage with a rod (not shown) or a tip section thereof (not shown). The rod is preferably a non-conductive material such as fiberglass. Such fiberglass rods are commonly referred to as "hot sticks" in the power line installation and maintenance industry. The rod may be of a single length or may alternatively include multiple rod sections that are extendable through telescoping, folding, or any combination thereof. Eye 37 may be completely closed as shown in FIG. 4B or may be slightly open to more resemble the appearance of a hook. Eye 37 may be configured such that an outer diameter of the rod is less than the opening of eye 37 thereby allowing the rod to pass through the eye 37. A user may insert the rod through the eye 37 and use the rod to turn body 12. Eye 37 may also be configured to engage with a tip section of the rod. Any tip section now known or developed in the future that are configured to engage with eye 37 wherein a user utilizes the rod and tip to turn body 12 is within the scope of the present invention.

An alternative embodiment not shown, but similar in appearance to the embodiments shown in FIGS. 1-3B, includes second end 18 of body 12 being configured to engage cooperatively with a device for turning the spreading device. One embodiment of second end 18 of body 12 may further include one or more planar surfaces 34 and have a cross-section similar to handle 14 in FIGS. 3A and 3B. These planar surfaces 34 on second end 18 may be positioned and located to facilitate cooperative engagement with a device for turning the spreading device. A device for turning the spreading device of the present invention may be a human hand and arm, a handle, a pair of pliers, a ratchet, a socket, a wrench, a pair of vise-grips, a screw-driver, or an electric, pneumatic, or cordless drill, driver or other power tool, or any tool now known or hereafter developed.

Handle 14 or 36 may be of an ergonomic design allowing the handle to be easily gripped by a human hand and may also include a textured or roughened portion to further facilitate gripping by a user. One embodiment may include an abrasive applied to or molded within at least a portion of handle 14. The interface between body 12 and handle 14, 36, or 37 must be sufficient to transfer the torsional force applied by a user to body 12.

Handle 14, 36 or 37 may be of any material known in the art including, but not limited to, UHMW polyethylene, low-density polyethylene, high-density polyethylene, wood, aluminum, steel, brass, copper, glass, porcelain, and other metals or composite polymer materials. The spreading device 10 may be used with live conductor lines and, therefore, a material that is electrically non-conductive or an insulator is preferable. One embodiment includes handle 14, 36, or 37 being made of UHMW polyethylene. An embodiment of handle 14 or 36 being metallic may also include an insulating layer of rubber or plastic around at least the portion of the metallic handle to be held by the user. Handle 14, 36 or 37 can, however, be made from any material known in the art that provides one or more of the above-identified properties and still be within the scope of the present invention.

Handle 14, 36 or 37 may be machined from stock materials, or it may be cast, forged, molded, extruded, or blown. The machining may be done manually, or may be performed by an automatic machining system as known in the art. Automatic manufacturing may be performed in a CAD/CAM system. An alternative method of manufacture includes injection molding, compression molding, resin transfer molding, transfer molding of composite materials or metals, and any other suitable molding method now known or hereafter discovered.

Figure 5:
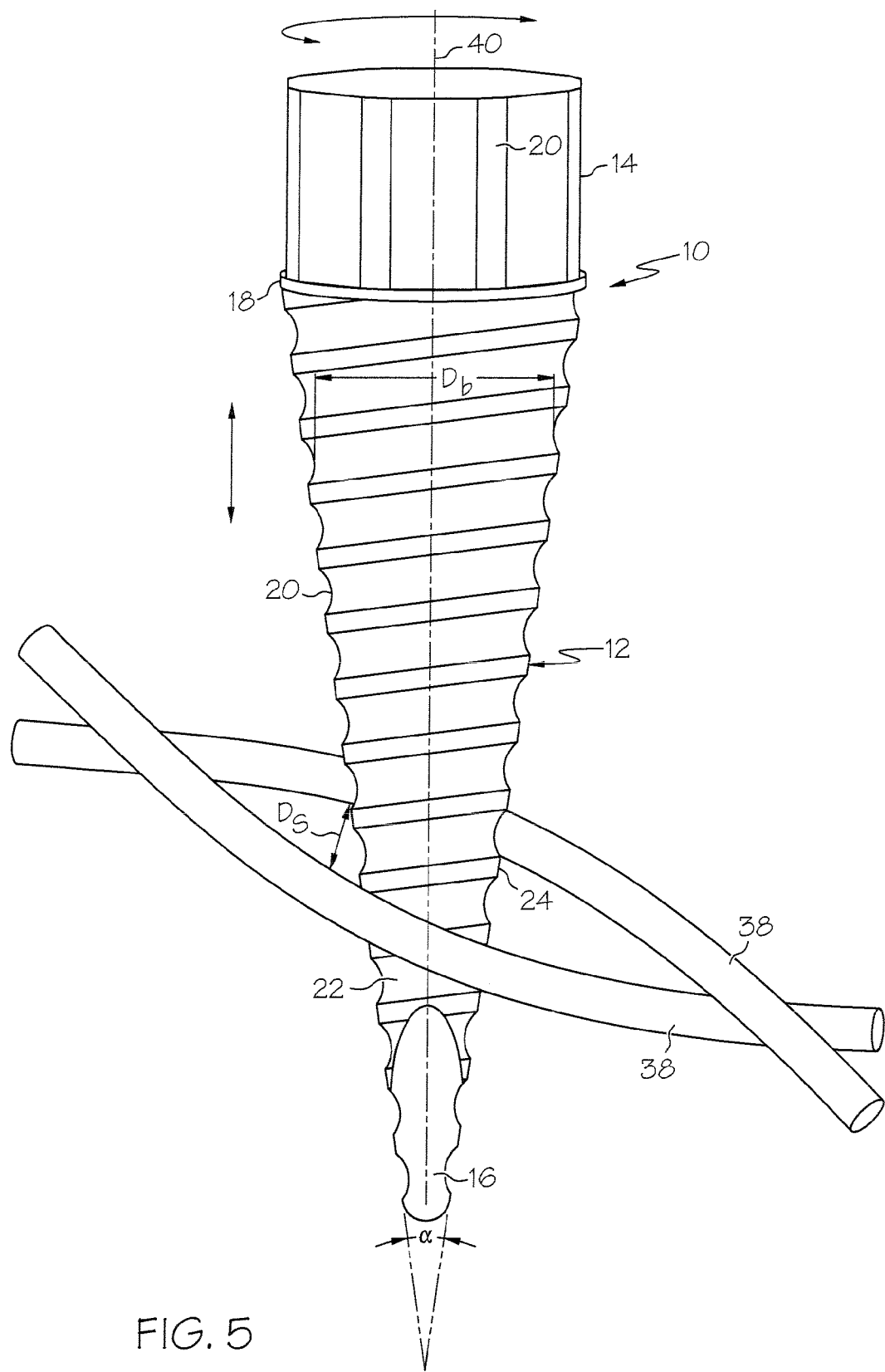
FIG. 5 is a top perspective view of the power line spreading device of FIG. 1 engaged with a pair of twisted power lines.

FIG. 5 illustrates one embodiment of spreading device 10 of the present invention in use. Spreading device 10 is used to mechanically separate two tensioned lines, and in one embodiment, the two conductor lines 38 of a twisted pair conductor that is currently used in the commercial transmission of electricity. In use, a user inserts first end 16 between the two conductor lines 38 of the twisted pair conductor. As described above, an embodiment of spreading device 10 may include machined end portions 26 and 28 to facilitate insertion of the device. As shown in FIGS. 2 and 4, machined end portions 26 and 28 are generally configured to make it easier for a user to insert spreading device 10 between two conductor lines 38 of the twisted pair conductor to begin the separation and spreading of the two conductor lines 38. First end 16 having a wedge or curved profile provides a substantially flat and narrow surface allowing the user to wedge spreading device 10 between two conductor lines 38 such that the power lines are positioned on spreading device 10 and such that the conductor lines begin to gradually separate and engage groove 22.

Now referring back to FIG. 5, once first end 16 of spreading device 10 is between two conductor lines 38, spreading device 10 is rotated about longitudinal axis 40 to advance the spreading device with respect to the conductor lines 38. The direction of rotation will correspond to the configuration of groove 22 and thread 24 provided. Groove 22 generally receives a portion of conductor lines 38 and outer surface 20 of groove 22 engages conductor lines 38 as shown in FIG. 5. Rotation of spreading device 10 about longitudinal axis 40 linearly advances conductor lines 38 with respect to body 12 in a direction from first end 16 toward second end 18. It is an advantage for body 12 to be a material having a smooth surface that provides low friction resistance to facilitate the rotation of body 12 with respect to the conductor lines 38. As conductor lines 38 linearly advance with respect to body 12 such that conductor lines 38 move closer to second end 18, the increase in diameter $D_b$ along the length $L_b$ of body 12 gradually increases the spread distance $D_s$ between conductor lines 38. A user will continue to rotate body 12 until the desired spread distance $D_s$ is obtained. A person of skill in the art will appreciate that varying the vertex angle α and thread spacing S provides a spreading device 10 that requires more or less force to rotate the body 12 thereby requiring more or less rotations to provide the same spread distance $D_s$.

As the spread distance $D_s$ between conductor lines 38 increases, the tension in each conductor line 38 causes an increased compressive force generally normal to outer surface 20 of spreading device 10. Because spreading device 10 has a substantially conical shape and the compression force is applied generally normal to outer face 20, the compressive force necessarily includes a thrust component force in the direction of the longitudinal axis 40 of body 12. Thread 24 resists this thrust force component by restraining spreading device 10 from sliding linearly in relation to the conductor lines 38. In addition, the friction resulting from the compression force is generally sufficient to maintain the position of spreading device 10 relative to conductor lines 38 by itself.

Thus, the configuration of groove 22 and thread 24 improves the overall effectiveness of the present invention because it allows a user working on a conductor line to insert the tool, create the desired spread distance $D_s$, and does not require it to be held in place by a user, thereby leaving both of the user's hands free to perform the coupling of a connector or other device to a conductor line. Also, because of its conical shape, the present spreading device 10 can also be easily moved along the length of the twisted connector lines 38 when the device 10 is at the spread distance $D_s$. This further enables a user to move the device 10 to another location in the vicinity of initial insertion, if necessary, to complete a particular installation. Spreading two conductor lines using spread device 10 increases the safety of the user because the user no longer needs to push or pull a wooden stake, hammer handle, or screw-driver from between the two conductor lines exposing the user to a substantial opportunity for losing his/her balance due to drastic changes in resistance. This feature is particularly beneficial when the user is suspended multiple feet above the ground while working on live conductor lines 38.

Once the desired spread distance has been obtained using spreading device 10, the user may install a connector or other device to one or both of the two conductor lines of the twisted pair conductor. Once the installation is complete, the user can back out spreading device 10 by rotating body 12 of spreading device 10 about longitudinal axis 40 in the opposite direction to that which obtained the spread distance. Once the two conductor lines 38 are proximate the first end 16, the spread device 10 may be removed from engagement with the twisted pair conductor.

From the foregoing, it may be seen that the power line spreading device of the present invention is particularly well suited for the proposed usages thereof. Furthermore, since certain changes may be made in the above invention without departing from the scope hereof, it is intended that all matter contained in the above description or shown in the accompanying drawings be interpreted as illustrative and not in a limiting sense. It is also to be understood that the following claims are to cover certain generic and specific features described herein.

We claim:
1. A power line spreading device comprising:
a substantially conical body having an outside face, a first end and a second end, said body having a first groove defined in said outside face and a second groove defined in said outside face adjacent to said first groove wherein said first groove and said second groove form a double conic spiral beginning proximate said first end and extending to proximate said second end;
wherein said grooves each have a width and a depth configured to receive a portion of a power line; and
wherein said second end is configured to cooperatively engage a turning device for turning said body.

* * * * *